United States Patent [19]

Ronzoni et al.

[11] E Re. 28,594

[45] Reissued Oct. 28, 1975

[54] MANUFACTURED ARTICLES OF BLENDS OF THERMOPLASTIC POLYMERS HAVING DIFFERENT FLUIDITY DEGREES

[75] Inventors: Isidoro Ronzoni, Camerlata (Como); Mario Catoni, Milan; Pier Lodovico Chini, Bergamo, all of Italy

[73] Assignee: Monecatini Societa General per et al., Milan, Italy

[22] Filed: Apr. 12, 1974

[21] Appl. No.: 460,551

Related U.S. Patent Documents

Reissue of:

[64] Patent No.: 3,655,829
Issued: Apr. 11, 1972
Appl. No.: 425,320
Filed: Jan. 13, 1965

[30] Foreign Application Priority Data

Jan. 14, 1974 Italy ..... 888/74

[52] U.S. Cl. ... 260/876 R; 260/30.6 R; 260/23 AR; 260/45.8 N; 260/45.75 K; 260/45.95; 260/874; 260/893; 260/898; 260/901; 260/DIG. 32; 264/171; 264/176; 264/349

[51] Int. Cl. ..... C08f 24/24

[58] Field of Search ..... 260/901, 876

[56] References Cited

UNITED STATES PATENTS

| | | | |
|---|---|---|---|
| 2,326,543 | 8/1943 | Macht | 260/901 |
| 2,887,464 | 5/1959 | Coover et al. | 260/901 |
| 3,055,859 | 9/1962 | Vollmert | 260/901 |
| 3,060,148 | 10/1962 | Evans et al. | 260/901 |
| 3,090,763 | 5/1963 | Hillier | 260/899 |
| 3,230,186 | 1/1966 | Kreibich | 260/889 |
| 3,310,505 | 3/1967 | Parker | 260/899 |

FOREIGN PATENTS OR APPLICATIONS

| | | |
|---|---|---|
| 740,994 | 11/1955 | United Kingdom |

*Primary Examiner*—Murray Tillman
*Assistant Examiner*—C. J. Seccuro

[57] ABSTRACT

Stippled surface thermoplastic articles are produced by extruding a mixture of a polymer of higher fluidity degree and one of lower fluidity degree at a temperature above the temperature of fluidization of the former but below the temperature of fluidization of the latter. Preferred polymers include polymethylmethacrylate, ABS type resins, and various copolymers of methylmethacrylate or of styrene.

13 Claims, 1 Drawing Figure

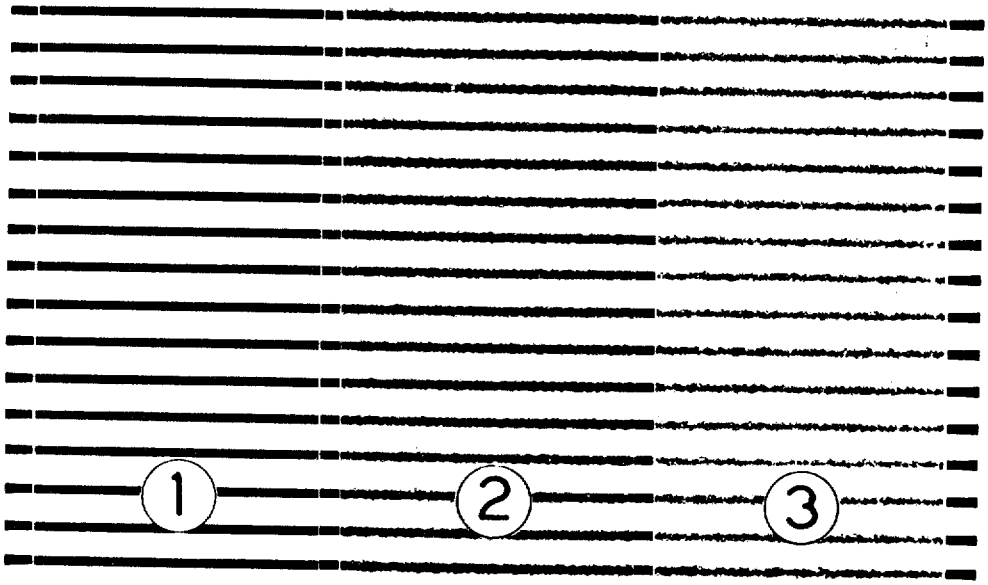
INVENTORS.
ISIDORO RONZONI, MARIO CATONI & PIER LODOVICO CHINI
BY
Patricia Q. Peake
ATTORNEY

MANUFACTURED ARTICLES OF BLENDS OF THERMOPLASTIC POLYMERS HAVING DIFFERENT FLUIDITY DEGREES

Matter enclosed in heavy brackets [ ] appears in the original patent but forms no part of this reissue specification; matter printed in italics indicates the additions made by reissue.

---

This invention relates to manufactured articles made from thermoplastic polymers, which articles have a stippled surface appearance and are obtained by direct extrusion, and to a process for their production.

An object of the present invention is the preparation of manufactured articles (e.g. flat and corrugated plates, pipes, structural shapes) from thermoplastic polymers, or mixes of thermoplastic polymers, having a stippled surface appearance, by direct extrusion of the materials in the extruder. By the use of the term "manufactured article having a stippled surface appearance," we mean a manufactured article which, although homogeneous internally, has discontinuities on its surface, namely "stipple or pin-spots" which on the whole produce a decorative appearance; these decorative effects are also known as embossing, and therefore the materials are said to be embossed articles.

At the present time, these effects are obtained by a batch process, by placing the polymer in a vertical press provided with a suitable metallic mold at a high temperature, or alternatively, by a continuous process, by calendering the polymer articles obtained by extrusion or molding by means of engraved cylinders. Such articles with a stippled surface appearance can also be obtained by casting in suitable molds.

The present invention eliminates further treatment of the articles or the use of additional equipment to obtain the stippled effect, thus effecting a substantial saving of time and effort.

It has now been found that by extruding a suitable mixture of thermoplastic polymers, the stippled effect is obtained directly at the extruder outlet without the necessity of additional processing. The polymer mixture used herein consists essentially of two components: the first component being a thermoplastic polymer or mixture of thermoplastic polymers having a high fluidity, or a low viscosity, in the molten state; and the second component being a thermoplastic polymer or mixture of thermoplastic polymers having little or no fluidity or, in other words, having a high viscosity, in the molten state. Fluidity degree is determined according to ASTM 1238–62 with the following particular conditions:

Temperature–190° C.

Nozzle diameter–3 mm.

Load on the plunger–10 kg.

Suitable mixtures include those wherein the first (high fluidity) component is polymethylmethacrylate having a fluidity degree of from 0.8 to 1.3 and the second (low fluidity) component is polymethylmethacrylate having a fluidity degree from 0.1 to 0.3. Other suitable mixtures include, for example, polyvinylchloride, polymethylmethacrylate having a fluidity degree of from 0.8 to 1.3, and polymethylmethacrylate having a fluidity degree of 0.1 to 0.3.

One combination of thermoplastic polymers of the present invention is a polymethylmethacrylate having a fluidity of 1.1, and a polymethylmethacrylate having a fluidity of 0.18. Another is a polymethylmethacrylate having a fluidity of 1.1 and polymethylmethacrylate, cross-linked with 1% of glycoldimethacrylate, having a fluidity which is so low as to be unmeasurable by the method indicated hereinabove.

In place of polymethylmethacrylate, its copolymers with styrene, alpha-methylstyrene, acrylic esters, methacrylic esters of higher aliphatic alcohols, acrylonitrile, and vinyl esters can be substituted, while proceeding with the process described herein. Similar results are obtained with styrene and its copolymers.

It is not necessary that the materials to be mixed have the same or analogous chemical structure; on the contrary it is only important that they are compatible and that they show a different fluidity.

As an example, stippled manufactured articles can be obtained by extruding polymethylmethacrylate having a low fluidity, with a mixture consisting of polyvinylchloride and polymethylmethacrylate having a normal fluidity; in this particular case the materials are also self-extinguishing. Another suitable mixture consists of an impact proof material comprising an ABS resin and of a polymethylmethacrylate having a fluidity of 0.18.

The polymers or the mixes of polymers having different fluidity employed in order to obtain these materials can be prepared in many different manners, that is, either in suspension or in bulk, or in solution, or in emulsion. However, in order to obtain the decorative effects which are the object of the present invention, it is essential that they are mixed in dry solid form, or as pellets suspended in a medium to be dried successively. The size of the polymers, pellets and granules or powders can be widely varied, but it is necessary that they be suitable for the commonly used extrusion process for thermoplastic materials.

The amounts of the two components are also widely variable, but an amount of about 5% of the polymer having the low fluidity is sufficient to give the above described stippled effects. A preferred ratio is from about 95 to 40 parts of the polymer having high fluidity, and from 5 to 60 parts of the polymer having low fluidity. However, higher amounts of the latter can be used, thus obtaining different effects as far as the intensity and the appearance are concerned.

It is further possible to use for the preparation of these articles of stippled surface appearance any of the additives generally used in plastic materials such as plasticizers, lubricants, antioxidants, coloring agents, absorbents of ultraviolet rays, etc., provided that they are used within suitable ratios, being added singly or together.

The process for the preparation of these articles of stippled surface appearance is very simple. Preferably the operation is carried out as follows: The previously mixed polymer (in the dry state) is fed into the extruder. The extruder works at a temperature higher than that suitable for the normal extrusion of the more fluid polymer, this temperature being in relation to the amount of the polymer having a low fluidity that is used, in the way, that higher amounts of the polymer having lower fluidity in the mixture require significantly higher operating temperatures of the extruder than those of the polymer having higher fluidity. In any case the extrusion temperature of the mixtures never reaches the extrusion temperature of the polymer having lower fluidity.

At the outlet of the extruder, the stippled surface article is cooled in air according to conventional methods. The mechanical properties of the manufactured articles which are obtained according to our process are analogous to those which are obtained by means of conventional processes.

The stippled surface articles of the present invention can be made using all of the conventional equipment for extrusion generally used for thermoplastic material. The decorative stippled effect can be seen either in transparent products or in opalinized, colored or pigmented materials. It can be intensified by suitably varying the optical characteristics of either of the materials or of both. Different effects without limitation of numerical quantity can be obtained, by varying materials used.

With regard to additional operations, the stippled surface appearance articles prepared according to the present invention, behave exactly the same as those having a smooth surface. In fact, cutting, shaping and gluing are performed under the same conditions and by use of the same equipment. Furthermore, it is to be noted that in the case of very great stretching, the stippled effect (surface showing stipple or pin-spots) of the plate and its superficial appearance remain unchanged. This characteristic is surprising, although extremely useful, since it allows one to maintain unchanged the effect of light diffusion in thin layers of opaline materials. This does not occur with numerous other materials. The stippled effect still remains even if the manufactured articles at the outlet of the extruder are treated with a smooth cylinder. In this situation, the stippled effect results in a brighter and smoother surface similar to that of sandblasted glass. The optical characteristics of these articles are particularly surprising, since they show simultaneously, both high transparency, and also, high light diffusion. The present invention includes products produced by the foregoing process which are thereafter calendered by treatment with engraved cylinders.

The following examples are given to illustrate the present invention without limiting it in any way. The amounts reported in the examples are to be understood as amounts by weight, unless the contrary is clearly stated.

EXAMPLE 1

15 kg./h. of the following mixture is fed to an extruder provided with degasification and having a head of 300 × 3.3 mm.:

100 parts of transparent polymethylmethacrylate pearls having a fluidity degree of 1.1 and an average diameter of between 0.1 and 0.3 mm.;

10 parts of transparent pearls of polymethylmethacrylate having a fluidity degree of 0.18 and an average diameter of between 0.1 and 0.3 mm.

The two types of polymethylmethacrylate have been previously mixed in a powder mixer for 20–30 minutes. The extruder works at a temperature of about 240° C. during the plastifying operation and during the degasification operation. In this way 18 m./h. of a flat plate having a thickness of about 3 mm. and width of 250 mm. is obtained. The plate is cooled in the air on a suitable draft gear. It shows on the surface (stipple or pin-spots) a typical stippled appearance. The light transmission and the light diffusion of this article measured according to ASTM D 1003 on specimens having a thickness of about 3 mm. are respectively 89 and 18%.

EXAMPLE 2

15 kg./h. of the following mixture is fed to an extruder similar to that described in Example 1:

100 parts of transparent polymethylmethacrylate pearls having a fluidity degree of 1.1 and a diameter of between 0.1 and 0.3 mm.;

20 parts of transparent polymethylmethacrylate pearls having a fluidity degree of 0.18 and an average diameter of between 0.1 and 0.3 mm.

The two types of polymethylmethacrylate have been previously mixed in a powder mixer for 20–30 minutes. The extruder works at a temperature of about 250° C. during the plastifying and degasification operation. In this way, 18 m./h. of a flat plate having a thickness of about 3 mm. and a width of about 250 mm. are obtained. The plate is cooled in the air on a suitable draft gear. It shows on the surface, a typical stippled decorative effect as can be seen in the accompanying diagram, wherein section 1 represents a top view of transparent normal plate of polymethylmethacrylate, placed on a drawing with thick lines, whereas section 2 thereof shows a top view of a part of a plate obtained by working as described in this example and placed on the same drawing. The light transmission and diffusion of this product measured according to ASTM D 1003 on a specimen having a thickness of 3 mm. are respectively 85 and 48%.

EXAMPLE 3

15 kg./h of the following mixture is fed to an extruder similar to that described in Example 1:

100 parts of transparent polymethylmethacrylate pearls having a fluidity degree of 1.1 and a diameter of between 0.1 and 0.3 mm.;

50 parts of transparent polymethylmethacrylate pearls having a fluidity degree of 0.18 and an average diameter of between 0.1 and 0.3 mm.

The two types of polymethylmethacrylate have been previously mixed in a powder mixer for 20–30 minutes. The extruder works at a temperature of about 250° C. during the plastifying and degasification step; in this way, 18 m./h. of a flat plate having a thickness of about 3 mm. and a width of about 250 mm. is obtained. The plate is cooled in the air on a suitable draft gear. It shows on its surface a typical and marked decorative stippled effect, as can be seen in section 3 of the accompanying diagram, which shows a top view of a plate of the product obtained according to the present process, and placed on a drawing having thick lines. The light transmission and diffusion of this product measured according to ASTM D 1003 on specimens having a thickness of 3 mm. are respectively 80 and 88%.

EXAMPLE 4

Two suspensions of polymethylmethacrylate pearls having a pearl content of about 25% are mixed in an autoclave in the ratio 10:2. The first suspension consists of transparent polymethylmethacrylate pearls having a fluidity degree of 1.1 and an average diameter of between 0.1 and 0.3 mm.; the second suspension consists of transparent polymethylmethacrylate pearls having a fluidity degree of 0.18 and an average diameter of between 0.1 and 0.3.

After agitating for 10 minutes, the mixture of the two suspensions is discharged into a centrifuge, and then the separated product is dehydrated and dried. The dry product is sent to an extruder similar to that described in Example 1, in quantities of 15 kg./h. The extruder works at a temperature of about 250° C. during the plastifying and degasification step. In this way, 18 m./h. of a flat plate having a thickness of about 3 mm. and a width of about 250 mm. is obtained. The plate is cooled in the air on a suitable draft gear. It shows on the surface a typical decorative stippled effect. The light transmission and diffusion of this product when measured according to ASTM D 1003 on specimens having a thickness of 3 mm. are respectively 85 and 48%.

EXAMPLE 5

15 kg./h. of the following mixture is fed to an extruder similar to that described in Example 1:

100 parts of transparent methylmethacrylate pearls having a fluidity degree of 1.1 and an average diameter of between 0.1 and 0.3 mm.

10 parts of transparent polymethylmethacrylate pearls having a fluidity degree of 0.18 and an average diameter of between 0.1 and 0.3 mm.;

| | Parts |
|---|---|
| Barium sulfate | 2 |
| Cacoyl violet ZIRS (anthraquinone derivative, NYMCO S.p.A. | 0.02 |
| Tinuvin P (hydroxy-phenyl-benzotriazole) | 0.1 |
| Stearic acid | 0.2 |

are fed. The mixture is first mixed in a powder mixer for 20–30 minutes and then sent to the extruder. The extruder works at a temperature of about 240° C. during the plastifying and degasification step. In this way, about 18 m./h. of a flat plate having a thickness of about 3 mm. and a width of 250 mm. is obtained. The plate is cooled in the air on a suitable draft gear. It is opalized and shows a typically stippled surface with a decorative effect. The light transmission and diffusion of this product, when measured according to ASTM D 1003, on specimens having a thickness of 3 mm., are 45 and 100% respectively.

EXAMPLE 6

15 kg./h of the following mixture is fed to the same extruder described in Example 1:

100 parts of transparent polymethylmethacrylate pearls having a fluidity degree of 1.1 and an average diameter of between 0.1 and 0.3 mm.;

20 parts of transparent polymethylmethacrylate pearls having a fluidity degree of 0.18 and an average diameter of between 0.1 and 0.3 mm.

| | Parts |
|---|---|
| Blue Vaxoline APS (Sesacolor S.p.A., color index: solvent blue 36, page 2883) | 0.007 |
| Red Vaxoline MPS (Sesacolor S.p.A., color index: dispersed red 9) | 0.0019 |
| Yellow Vaxoline IS (Sesacolor S.p.A., color index: solvent yellow 14, page 2821) | 0.00055 |
| Tinuvin P (hydroxy-phenyl-benzotriazole) | 0.200 |

The mixture is previously mixed in a powder equipment for 20–30 minutes and then it is sent to the extruder. The extruder works at about 250° C. during the plastifying and degasification step. In this way, 18 m./h. of a flat plate having a thickness of about 3 mm. and width of 250 mm. is obtained. The plate is cooled in the air on a suitable draft gear. It is grey colored and has the typically stippled decorative effect surface. The light transmission and diffusion of this product, when measured according to ASTM D 1003, on specimens having a thickness of 3 mm., are 67 and 44% respectively.

EXAMPLE 7

15 kg./h. of the following mixture is fed to the same extruder described in Example 1:

40 parts of transparent polymethylmethacrylate pearls having a fluidity degree of 1.1 and a diameter of between 0.1 and 0.3 mm.;

20 parts of transparent polymethylmethacrylate pearls having a fluidity degree of 0.18 and a diameter of between 0.1 and 0.3 mm.;

60 parts of polyvinylchloride pearls having a constant K of 62–65 (as constant K we intend the time for the fall measured in seconds between two winning-posts 10 cm. distant, of a steel ball having a weight of 2.03 g. into a test-glass having a diameter of 20 mm. containing the platisol (polyvinylchloride dioctylphthalate 60:40), at 20° C.

| | Parts |
|---|---|
| Trichloroethylphosphate | 5 |
| Stanclere (tin alkylmercaptide) 173 | 1.8 |
| Santowhite Crystal (4,4'-thiobis (6 tert. butyl-methacresol) | 0.0015 |
| Tinuvin P | 0.100 |
| Loxiol 30 (a wax like substance produced by Neynaber Society) | 0.500 |
| Loxiol 31 (esters of fatty acid produced by Neynaber Society) | 0.70 |
| Calcoil Violet Z1RS | 0.0003 |

The polymers and the additives are previously mixed in a powder mixer for 20–30 minutes and then sent to the extruder. The extruder works at a temperature of about 160–175° C. during the plastifying and degasification step. In this way, 18 m./h. of a flat plate having a thickness of about 3 mm. and a width of 250 mm. are obtained. The plate is cooled in air on a suitable draft gear. It is transparent and its surface is typically stippled with a decorative effect. Tested according to ASTM D 635 the plate proves also self-extinguishing.

EXAMPLE 8

15 kg./h. of the following mixture is fed to an extruder similar to that described in Example 1:

| | Parts |
|---|---|
| Transparent polymethylmethacrylate pearls having a fluidity degree of 1.1 and a diameter of between 0.1 and 0.3 mm. | 100 |
| Transparent polymethylmethacrylate granules having a fluidity degree of 0.18 and a diameter of between 0.8 and 2.5 mm. and obtained by milling polymethylmethacrylate prepared in bulk | 20 |

The two types of polymethylmethacrylate have been previously mixed in a powder mixer for 20–30 minutes. The extruder works at a temperature of about 250° C. during the plastifying and degasification step. In this way 18 m./h. of a flat plate having a thickness of about 3 mm. and a width of about 250 mm. are obtained. The plate is cooled in air on a draft gear. The plate shows a typical decorative stippled effect on the surface. The light transmission and diffusion of this product, when measured according to ASTM D 1003, on specimens having a thickness of 3 mm. are 85 and 48% respectively.

EXAMPLE 9

15 kg./h. of the following mixture is fed to the same extruder described in Example 1:

| | Parts |
|---|---|
| Granules of an impact-proof ABS resin (type B 32 produced by Montecatini Edison S.p.A.) | 80 |
| Polymethylmethacrylate pearls having a fluidity degree of 0.18 and an average diameter of between 0.1 and 0.3 mm. | 20 |

The polymers are previously mixed in a powder mixer for 20–30 minutes and then sent to the extruder. The extruder works at a temperature of 180°–200° C. during the plastifying phase and degasification step.

In this way 18 m./h. of a flat plate having a thickness of about 3 mm. and about 250 mm. width are obtained. The plate is opaque and its surface is typically stippled with a decorative effect.

EXAMPLE 10

80 kg./h. of the following mixture is fed to an extruder provided with degasification and having a head of 1,250 mm.:

| | Parts |
|---|---|
| Transparent polymethylmethacrylate pearls having a fluidity degree of 1.1 and a diameter of between 0.1 and 0.3 mm. | 100 |
| Transparent polymethylmethacrylate pearls having a fluidity degree of 0.18 and diameter of between 0.1 and 0.3 mm. | 20 |

The two types of polymethylmethacrylate have been previously mixed into a powder mixer for 20–30 minutes. The extruder works at a temperature of about 250° C. during the plastifying and degasification step. In this way, 20 m./h. of a plate having a thickness of about 3 mm. and a width of about 1,200 mm. are obtained. This plate is transparent and its surface shows the typical stippled decorative effect. The light transmission and diffusion of this product when measured according to ASTM D 1003 are 85 and 48% respectively.

While the present invention has been described with particular reference to specific examples, it is not to be limited thereby, but reference is to be had to the appended claims for a definition of its scope.

What we claim and desire to protect by Letters Patent is:

1. A process for producing articles having a stippled surface, said [ method ] *process* comprising extruding a mixture of at least two thermoplastic polymers having different degrees of fluidity, the ratio of the fluidity of the polymer having the higher degree of fluidity to the fluidity of the polymer having the lower degree of fluidity being at least 2.67, said extrusion being performed at a temperature higher than the temperature of fluidization of the polymer having a higher degree of fluidity and lower than the temperature of fluidization of the polymer having the lower degree of fluidity, said degree of fluidity being determined according to ASTM 1238-62 at 190° C with nozzle diameter of 3 mm and plunger load of 10 kg; said polymers being selected from the group consisting of polymethyl methacrylate, a copolymer of methylmethacrylate with an acrylic ester or methacrylic ester of a higher aliphatic alcohol; polymethyl-methacrylate cross-linked with glycoldimethacrylate; [ and ] an impact-proof ABS resin *and a copolymer of methylmethacrylate and styrene*, at least one of said polymers being a polymethylmethacrylate polymer.

2. The process of claim 1, wherein the polymer component having high fluidity is prsent in a ratio of from 95 to 40 parts by weight, while the polymer component having low fluidity is present in a ratio of from 5 to 60 parts by weight.

3. The process of claim 1 where a coloring agent is added to the polymer mixture, before extrusion.

4. The process of claim 1 where an antioxidant is added to the polymer mixture, before extrusion.

5. The process of claim 1 where a plastifier is added to the polymer mixture, before extrusion.

6. The process of claim 1 where coloring agents, antioxidants and plastifiers are added to the polymer mixture singly or together.

7. The process of claim 1 wherein two polymethylmethacrylates of differing degrees of fluidity are used.

8. The process of claim 1 where one polymethylmethacrylate has a fluidity degree of from 0.8 to 1.3; while the second polymethylmethacrylate has a fluidity degree from 0.1 to 0.3.

9. The process of claim 1, wherein polymethylmethacrylate and polymethylmethacrylate cross-linked with 1% of glycoldimethacrylate are use.

[ 10. The process of claim 1 where the polymer mixture consists of polyvinylchloride, polymethylmethacrylate which has a fluidity degree of from 0.8 to 1.3, and polymethylmethacrylate which has a fluidity degree of 0.1 to 0.3. ]

11. A method for the production of an article of manufacture having a rough surface which diffuses light which comprises blending (1) particles of a cross-linked, thermoplastic polymer of a monomer selected from the group consisting of a methacrylate, said polymer having been cross-linked with a polyfunctional, cross-linking monomer, with (2) a non-cross-linked, thermoplastic polymer of a monomer selected from the group consisting of a methacrylate, and directly forming, by extrusion, the resultant blend, as such, into said article, wherein said non-cross-linked, thermoplastic polymer is molten at least during said forming and said particles have diameters ranging from about 0.1 mm. to 2.5 mm. and are present in said blend in an amount ranging from about 5% to about 60%, by weight, based on the total weight of the blend.

12. A method according to claim 11 wherein said thermoplastic polymers are polymers of methyl methacrylate.

13. An article of manufacture formed directly by extruding a blend of (1) particles of a cross-linked thermoplastic polymer of a monomer selected from the group consisting of a methacrylate, said polymer having been cross-linked with a polyfunctional, cross-linking monomer and (2) a non-cross-linked, thermoplastic polymer of a monomer selected from the group consisting of a methacrylate, wherein said particles have diameters ranging from about 0.1 mm. to 2.5 mm. and are present in said blend in an amount ranging from about 5% to about 60%, by weight, based on the total weight of the blend, and said non-cross-linked, thermoplastic polymer was molten at least during said extrusion of the blend.

14. A composition according to claim 13 wherein either thermoplastic polymer is a polymer of methyl methacrylate.

* * * * *

UNITED STATES PATENT AND TRADEMARK OFFICE

CERTIFICATE OF CORRECTION

PATENT NO. : Reissue 28,594

DATED : October 28, 1975

INVENTOR(S) : Isidoro RONZONI et al

It is certified that error appears in the above-identified patent and that said Letters Patent are hereby corrected as shown below:

[30] Foreign Application Priority Data "Jan. 14, 1974 Italy ..... 888/74" should read - - - Jan. 14, 1964 Italy ..... 888/64 - - -.

Signed and Sealed this

Twenty-seventh Day of July 1976

[SEAL]

*Attest:*

RUTH C. MASON
*Attesting Officer*

C. MARSHALL DANN
*Commissioner of Patents and Trademarks*